(12) United States Patent
Devine

(10) Patent No.: US 6,337,012 B1
(45) Date of Patent: Jan. 8, 2002

(54) UNIVERSAL MAGNETIC FILTER INSERT

(76) Inventor: Arthur J. Devine, 1310 Industrial Ave., Escondido, CA (US) 92029

( * ) Notice: Subject to any disclaimer, the term of this patent is extended or adjusted under 35 U.S.C. 154(b) by 0 days.

(21) Appl. No.: 09/515,979

(22) Filed: Feb. 28, 2000

(51) Int. Cl.[7] .............................................. B01D 35/06
(52) U.S. Cl. ...................... 210/223; 210/695; 184/6.25; 123/196 A
(58) Field of Search ................................ 210/222, 223, 210/695, 168, 171, 767; 184/6.24, 6.25; 123/196 A

(56) References Cited

U.S. PATENT DOCUMENTS

| | | | | |
|---|---|---|---|---|
| 2,117,361 A | * | 5/1938 | Rohrbach | 210/223 |
| 2,680,519 A | * | 6/1954 | Rundquist et al. | 210/223 |
| 2,932,398 A | * | 4/1960 | Korte | 210/223 |
| 3,342,339 A | * | 9/1967 | Riolo | 210/223 |
| 4,629,558 A | * | 12/1986 | Garritty | 210/223 |
| 5,228,990 A | * | 7/1993 | Chiang | 210/223 |
| 5,273,193 A | * | 12/1993 | Murakami et al. | 210/222 |
| 5,702,598 A | * | 12/1997 | Lemon | 210/223 |
| 6,207,050 B1 | * | 3/2001 | Holifield | 210/223 |
| 6,210,572 B1 | * | 4/2001 | Tulchinskiy | 210/223 |

OTHER PUBLICATIONS

"Easy Engine Saver", *Motor Trend* (Nov. 1999).
"Magna–Guard", *Max Power* (Feb. 2000).
"Magna–Guard", Top 10 New Products of 1999, *Aftermarket Business* (Feb. 2000).
"Magna–Guard", New Products, *Aftermarket Business*, Special Issue (Feb. 2000).
"Magna–Guard", Product–Review, *2000 Turbo Buick Newsletter*, vol. 13(5):11) Undated.
"Magnetic Appeal", *Powerline*, vol. 1(5), Undated.
"Magnetic Attraction", *Lowrider*, (Jul. 1999).

* cited by examiner

*Primary Examiner*—Joseph W. Drodge
(74) *Attorney, Agent, or Firm*—Lyon & Lyon LLP

(57) ABSTRACT

A dis-attached, monlithic magnetic filter hand inserted into the inner chamber of an oil filter canister or a fuel line enables a non-skilled user to turn an ordinary oil filter into an improved magnetic filter for attracting particles less than 30 microns contained in the recycled oil, without a substantial reduction in flow through the oil filter. The inexpensive magnetic filter insert may be re-usable or disposable and includes various optional elongated profiles.

15 Claims, 3 Drawing Sheets

UNIVERSAL MAGNETIC FILTER INSERT

BACKGROUND OF THE INVENTION

1. Field of the Invention

The present invention relates to fluid filter enhancement, and particularly to apparatus and methods for applying a magnetic field to the disposable, cylindrical automotive oil and fuel filters and the industrial equivalent.

2. Prior Art

Much of the minute abrasive alloy particles less than 20 to 30 microns produced by wear in engines or other machine apparatus are removed from the immediate site of production by lubrication oil only. They are reintroduced in the lubrication system as the oil is recycled and reapplied onto the site. Fine particles prevent the oil film from properly lubricating moving parts, causing friction and premature engine wear, Most often the lubrication fluid is filtered through a paper, fiber or equivalent filter, such as disposable screw-on canister filters, before being recycled through the lubrication system. The same filtering principle is often applied to liquid fuels such as gasoline, diesel fuel, petroleum and the like fluids that carry metallic particles collected from metallic pipelines or storage tanks. However, economically feasible or practical filters have little or no effectiveness for the smaller particles, especially minute abrasive metal particles Providing a filter or filter system with sufficiently fine filtration would be excessively costly and/or excessively impede the fluid flow, and thus be unacceptable for the majority of the applications.

Attempts to enhance the filtration of canister type filters have included introduction of various configuration of magnetic structures that are either housed in a holding element which in turn are installed at factory level inside the filter canister or are installed/attached outside the filter canister. For externally located magnetic filters, one or plural magnetic elements are brought in contact axially or radially outside the filter canister, some by strap means, others by slip fit cup means. While these magnetic filters have been generally satisfactory for their intended purpose, they have been characterized by certain drawbacks in that the magnetic force of the magnet is not only employed for attracting magnetic particles contained in the lubricating oil, but also for holding the cup or other attachment means on the filter canister resulting in the magnetic field to be shunted by the steel housing. Other drawbacks associated with these external attachments are their high cost and their potential liability of dislodgment as well as producing holes in the canisters as a result of continuous vibration.

However, the previously known internal magnetic structures typically require factory inclusion of a magnet in a canister filter. Except for magnetic drain plugs, no prior art magnetic filtering structure has made available to the non-skilled vehicle operator an inexpensive, affordable and reliable apparatus and method for turning instantly an ordinary oil filter into a super magnetic filter by a simple act of inserting manually a magnet element inside the chamber of a filter, without requiring any attachments or any additional skills, tools or other factory related operations.

Furthermore, the heretofore employed magnetic filters have been constructed and arranged to be attached only to oil filter canisters and not to other housings on the internal combustion engine containing fluid, such as the transmission housing or to other forms of fuel filters.

Finally, no previously known art has made available an insertable dis-attached disposable, ready-to-install, ready-to-use, magnetic filter that is universally adaptable to all size and types of filters with the added benefit of keeping the recycled lubricating oil or the flowing fuel in direct contact with the magnetic element without interfering with the oil or fuel flow. Additionally, the device of the invention can be optionally re-usable.

Filters incorporating magnetic elements for the purpose of capturing ferromagnetic particles too small to be captured by the filtering elements are shown in the following patents:

| U.S. Pat. Nos. | | | British |
| --- | --- | --- | --- |
| 819,436 | 1,806,001 | 1,944,208 | 557,214 |
| 2,014,800 | 2,149,764 | 2,184,243 | |
| 2,366,451 | 2,652,925 | 2,838,179 | German |
| 2,860,787 | 2,877,899 | 2,976,999 | |
| 2,980,257 | 3,034,651 | 3,035,703 | 478,770 |
| 3,151,703 | 3,289,841 | 3,447,687 | |
| 3,762,135 | 3,800,914 | 3,840,045 | |
| 4,450,075 | 4,629,558 | | |

Except for magnetic drain plugs, none of the prior art apparatus for removing cost-effectively small ferromagnetic particles from lubricating oil or fuel are known to be commercially successful or on the market today. One of the primary reasons for this lack of success is believed to be that the cost of the filters incorporating the magnetic means could not be justified in terms of tangible evidence of the economic benefits of using them. Therefore, the problem leading to the subject invention was to provide a filtering apparatus which effectively captures small ferromagnetic particles in lubricants and liquid fuels and which does so at less cost than the known prior art apparatus provided for that purpose, To overcome the disadvantages experienced in heretofore employed magnetic filters, the magnetic filter of the present invention has been devised to be very inexpensive, dis-attached, easily insertable inside a filter caniser or a transmission housing without requiring any skill or tools.

SUMMARY OF THE INVENTION

The preferred embodiment of the magnetic filtering device of the present invention comprises a stand-alone, dis-attached, magnetically self-adhering, elongated magnet element which is inserted into the inner chamber of an oil filter housing, The enhanced filtration method and apparatus according to the present invention applies a bipolar magnetic field to the inner surface of the filter housing with a substantially axially located magnet pole disposed about and along the inner surface of the filter housing, thereby magnetically energizing the lubrication fluid path within the filter housing. When used in oil filters, the magnetic energization is sufficiently intense to efficiently attract minute ferrous micro particles to the inner surface of the filter housing in direct contact with the magnetic field, and remain there attracted directly to the magnet surface, as the fluid proceeds through the lubrication system, returning to the site effectively and economically filtered. Similarly, when used in liquid fuel filters, fuel in the inlet line, flows over the magnetic filtering device which attracts minute ferrous micro particles to the inner surface of the filter housing in direct contact with the magnetic field, and remain there, as the fuel proceeds through the fuel line to a carburator or to a fuel injector.

The preferred embodiment of the magnetic filtering device is an easily manufactured monolithic part, inexpensive and easily installable in virtually every oil or fuel filtering device for the removal from lubrication oil and liquid fuels of the minute abrasive alloy particles produced by wear in engines, by corrosion in fuel lines and tanks, or particles entrained in other machine apparatus.

Whether hand inserted in an oil or fuel filter canister by an amateur consumer or a professional mechanic, the device can achieve heretoforth achievable successful results in removing abrasive particles from lubrication oil and from fuel lines.

Such an ability is especially helpful for filter canisters that have no factory installed filtering magnets, which constitute virtually all available filters on the market. The person desiring to turn an ordinary filter into an improved magnetic filter is thus able to transform the filter by simply griping the magnet between his fingers and hand insert it through the canister screw bore without requiring any tool. The inserted magnet self-clings instantly to the canister's internal metallic walls, attracted to the walls by its own magnetic field, without requiring any additional attachment means.

The magnetic filter of the invention is designed to be so cost-effective that it can be economically disposed along with the disposable canister.

The magnetic filter of the invention is also re-usable after dis-attaching it from the canister inner chamber followed by a cleaning of the accumulated sludge and minute particles that have adhered unto it. There is no loss of magnetic field after re-use of the magnet.

The fuzzy nature of the ferrous accumulate tends to clump elements together which forms a tightly adhering gummy sludge on the magnet surface that serves to attract other non-ferrous particles such as silver, sodium, chromium, lead, copper, silicon (dirt and sand), aluminum, nickel, magnesium, carbon (soot and sludge as the result of combustion) and gold.

An object of this invention is to provide a device for removing magnetically attractable particles from engine lubricating oil and fuel lines.

Another object of this invention is to provide a device for removing non-ferrous particles that accumulate on the magnet surface as part of a tightly adhering gummy sludge.

A further object of this invention is to provide a device for attracting and holding magnetically attractable particles against the inner chamber of an oil or liquid fuel passageway to remove same from the oil or the liquid fuel.

A further object of this invention is to provide a device to supplement a pre-existing oil filter cartridge or canister in removing particles from lubricating oil and liquid fuels.

Yet, another object of this invention is to provide an easily installable and easily usable magnetic filter that is universally adaptable for installation inside the inner chamber of the majority of filter canisters available on the automotive and marine market.

Another object of this invention is to provide to the non-skilled person an inexpensive, affordable and reliable apparatus and method for turning instantly an ordinary oil filter into a super magnetic filter.

A further object of this invention is to provide an apparatus and a method that can easily and economically attract, capture and remove the micro-fine abrasive ferrous particles of less than 3 microns produced by wear in engines or other machine apparatus.

Additionally an object of this invention is to provide an apparatus and a method for extending an engine life and increase efficiency, thus improving fuel economy and horsepower.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE
PREFERRED EMBODIMENT OF THE
INVENTION

Figure 1:
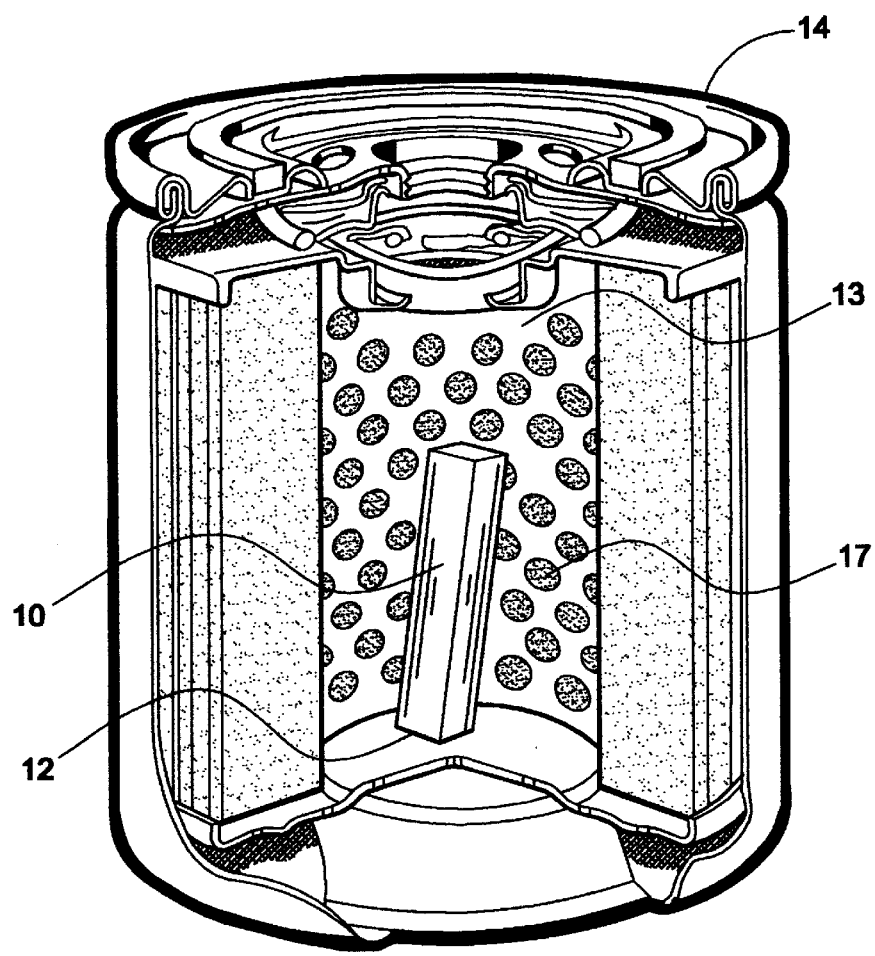
FIG. 1 is a cross-sectional perspective view of a filter canister showing a preferred embodiment of the device comprising an elongated, dis-attached, stand-alone magnetic filter element magnetically self-clinging to the inner chamber of the canister.
Figure 2:
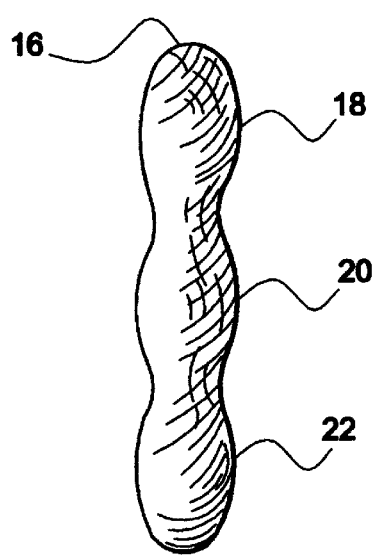
FIG. 2 is a side view of an embodiment of the device showing a multi-seeded peanut-shape magnetic filter. This configuration eliminates entirely the possibility of flow resistance to the circulating oil lubrication.
Figure 3:
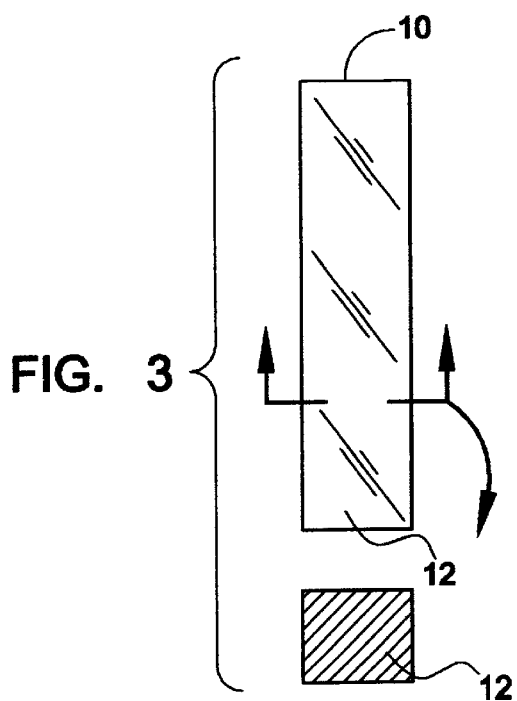
FIGS. 3 and 7 show a cross-sectional view of an elongated, dis-attached, rectangular filter element and a perspective view of said rectangular filter element self-clinging to the inner section of a ferrous tube filter fuel line.
Figure 4:
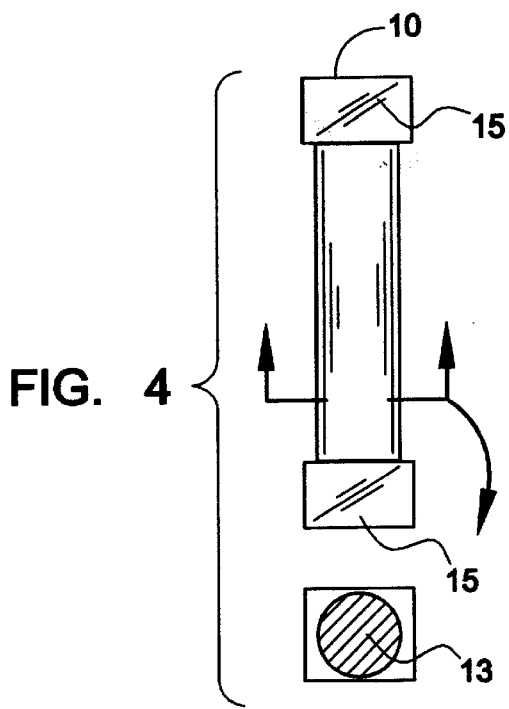
FIG. 4 and 5 are perspective views of two embodiments of the device showing respectively an elongated magnetic filter of circular profile and an elongated magnetic filter of oval profile having rectangular tails at both ends, similar to a 'dog bone'.
Figure 5:
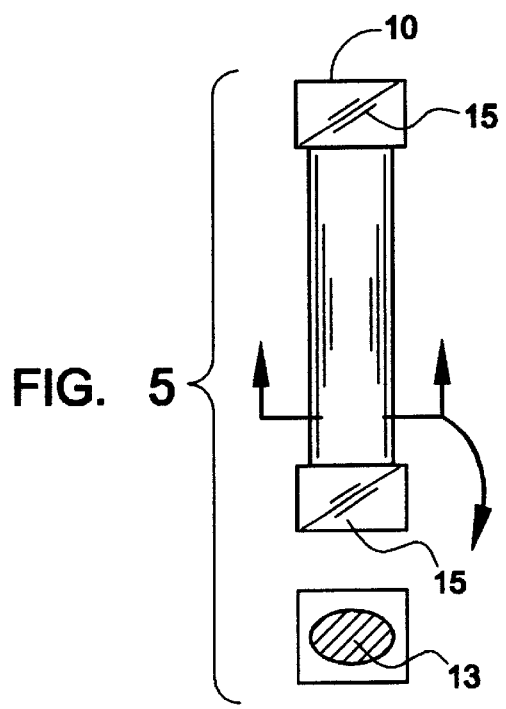
Figure 6:
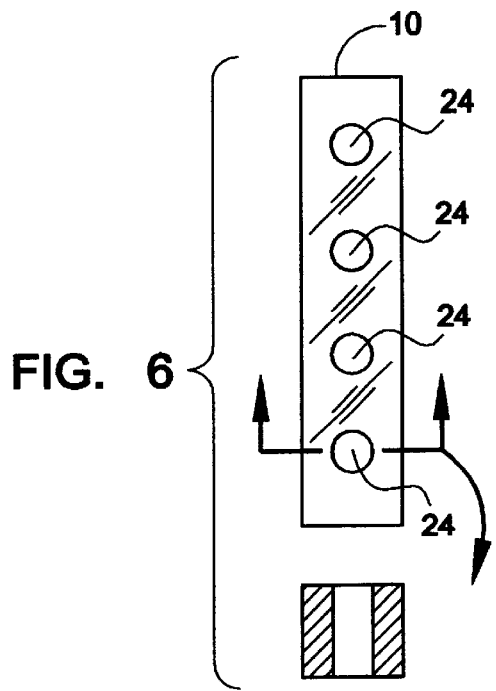
FIG. 6 is a side view of an embodiment of the device showing an elongated rectangularly profiled magnetic filter having transverse holes.
Figure 7:
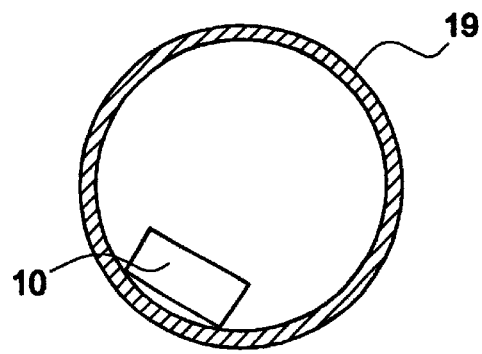

Referring now to the drawing FIG. 1 which depicts current preferred embodiment of the invention showing the magnetic filter 10 having an elongated rectangular body 12, said magnetic filter self-clinging magnetically to the inner chamber 13 of the filter canister 14. Other embodiments of the invention feature different optional profile configurations as shown in FIGS. 2–6. FIG. 2 shows a multi-seeded peanut shape magnetic filter 16 that has three bulges 18, 20 and 22. FIG. 4 and 5 show two magnetic filters 10 having respectively an elongated circular and an oval-shaped profile 13 ending with two rectangular-shape enlargements 15, one at each end, like a 'dog-bone'. FIG. 6 shows an elongated rectangularly profiled magnetic filter 10 having plural transverse holes 24. Said four optional profiles of FIG. 2–4 are designed to eliminate any possibility for the magnetic filter 10 to cause any reduction or resistance to the recycled oil flow or fuel flow passing through the inner chamber holes 17. The magnetic filter 10 is best made of powerful monolithic ceramic 5 or 8 ferrite magnet. Optionally, other magnetic material selected from the group, but not restricted to, neodymium iron boron magnet or sintered aluminum-nickel-cobalt material may be used. FIG. 7 shows an elongated rectangularly profiled magnetic filter 10 clinging to a ferrous filter tube line 17. FIG. 6 shows a close-up view of the gummy sludge 26 that clumps on the surface of a magnetic filter, said sludge 26 attracting, trapping and collecting micro-fine metal and non-metal particles on said surface.

Figure 8:
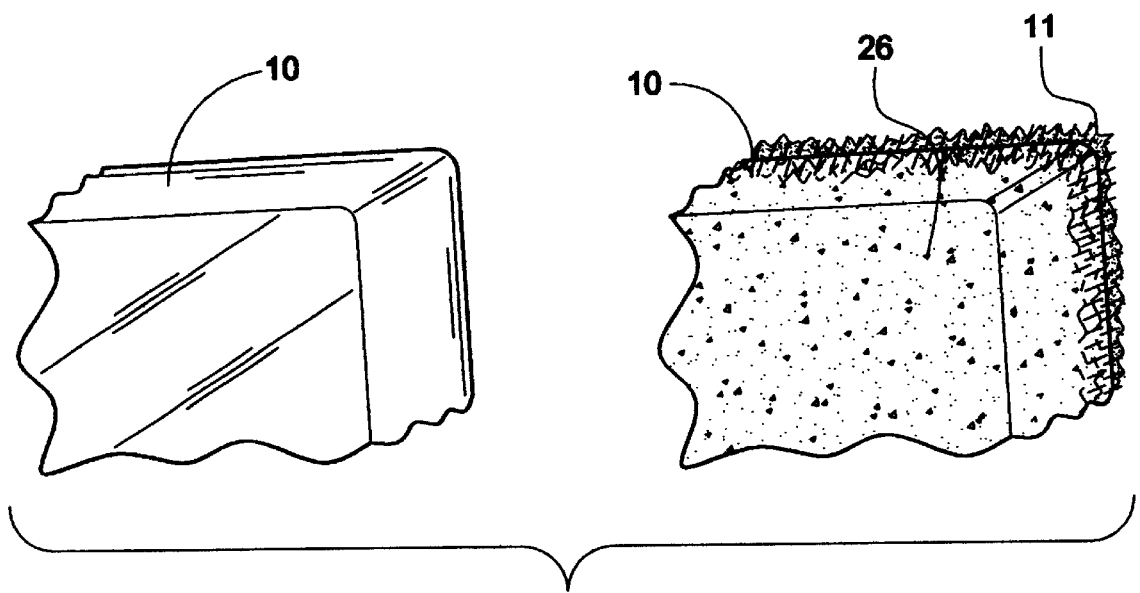
FIG. 8 is a close-up picture of the gummy sludge that clumps on the surface of a clean magnetic filter (left picture) after installation (right picture), said sludge attracting, trapping and collecting micro-fine metal and non-metal particles on said surface.

In this manner any user of an oil or a fuel filter in the automotive and marine industry can use a universally adaptable magnetic filter 10, said magnetic element adaptable to all sizes and all models of filters 14 and can easily install said inexpensive, affordable, hand insertable magnetic filter 10 on the inner chamber walls 13 of an oil filter 14 or in the inner surface of a fuel line 19, without requiring any form of skills or tools. When using said inexpensive hand insertable magnet element 10 non-skilled users may turn easily and instantly an ordinary canister filter 14 into a magnetically active super filter that can attract, capture and remove micro-fine abrasive ferrous particles 11 of less than 3 microns. In the same manner, as shown in FIG. 8, a gummy sludge 26 attracts, traps and collects also micro-fine non-metallic particles on said magnetic filter's surface.

Another function of the preferred embodiments of the invention is that said magnetic filter 10 when inserted into said canister filter 14 extends an engine life and increases overall efficiency, thus improving fuel economy and horsepower.

Of course conventional combinations of magnets can be used including non-ceramic magnets instead of ceramic 5 magnets. While all of the fundamental characteristics and features of the magnetic filter insert of the invention have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A method of converting an oil filter for automotive or marine use to a magnetically active oil filter, comprising:
   providing an oil filter for automotive or marine use, the oil filter including a filter element, bore and an interior chamber;
   providing a monolithic, self-clinging, dis-attached, hand-insertable magnet insertable in said oil filter for automotive or marine use for attracting element particles that otherwise pass through said filter element;
   inserting said, monolithic, self-clinging, dis-attached, hand-insertable magnet through said bore and into said interior chamber of said oil filter for automotive or marine use, so as to cause said oil filter for automotive or marine use to be converted into a magnetically active oil filter that attracts element particles that otherwise would pass through said filter element without a substantial reduction of flow through said filter.

2. The method according to claim 1, wherein the magnet has an elongated body shape having a rectangular cross-sectional configuration.

3. The method according to claim 1, wherein the magnet has an elongated body with a generally 'dog-bone' shape, the magnet having two short end-sections of rectangular-shape joined together by a longer central section of smaller cross-section, said smaller cross-section of said central section having a configuration from the group consisting of an oval-shape and a cylindrical-shape.

4. The method according to claim 1, wherein the magnet has an elongated rectangular-shape configuration with a plurality of holes passing therethrough.

5. The method according to claim 1, wherein the magnet has an elongated peanut-shape body having plural bulges.

6. The method according to claim 1, further including disposing of the magnet with the oil filter after said use.

7. The method according to claim 1, further including re-using the magnet with a new, different oil filter after said use.

8. The method according to claim 1, wherein the magnet provides a field strength of at least 540 gauss in said filter.

9. The method according to claim 1, wherein the magnet comprises a neodymium iron boron magnet.

10. The method according to claim 1, wherein the magnet comprises a ferrite material.

11. The method according to claim 1, wherein the magnet comprises a sintered aluminum-nickel-cobalt material.

12. The method according to claim 1, wherein the magnet comprises a aluminum-nickel-cobalt material.

13. The method according to claim 1, wherein the magnet attracts ferrous particles of less than 3 microns.

14. The method according to claim 1, wherein the magnet attracts a gummy sludge, said sludge attracting, trapping and collecting micro-fine metal and non-metal particles.

15. The method according to claim 1, wherein the magnet comprises at least one of a ceramic 5 magnet and a ceramic 8 magnet.

* * * * *